US008483726B1

(12) United States Patent
Khanka et al.

(10) Patent No.: US 8,483,726 B1
(45) Date of Patent: Jul. 9, 2013

(54) METHODS FOR INTELLIGENTLY SHEDDING PAGES

(75) Inventors: Bhagwan Khanka, Lenexa, KS (US); Sachin R. Vargantwar, Overland Park, KS (US); Deveshkumar Rai, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 542 days.

(21) Appl. No.: 12/578,114

(22) Filed: Oct. 13, 2009

(51) Int. Cl.
*H04W 68/00* (2009.01)

(52) U.S. Cl.
USPC .......................... 455/458; 455/453; 455/459

(58) Field of Classification Search
USPC ........................................................ 455/458
See application file for complete search history.

(56) References Cited

U.S. PATENT DOCUMENTS

| | | | | |
|---|---|---|---|---|
| 5,307,399 A | * | 4/1994 | Dai et al. | 455/459 |
| 5,533,094 A | * | 7/1996 | Sanmugam | 455/426.1 |
| 5,570,411 A | * | 10/1996 | Sicher | 455/450 |
| 5,767,785 A | * | 6/1998 | Goldberg | 340/7.43 |
| 5,854,979 A | * | 12/1998 | Iwajima | 455/426.1 |
| 6,091,719 A | * | 7/2000 | Kondo et al. | 370/345 |
| 6,400,942 B1 | * | 6/2002 | Hansson et al. | 455/426.1 |
| 6,545,996 B1 | * | 4/2003 | Falco et al. | 370/347 |
| 6,859,440 B1 | * | 2/2005 | Sonti et al. | 370/252 |
| 2004/0248596 A1 | * | 12/2004 | Panchal | 455/466 |
| 2005/0197121 A1 | * | 9/2005 | Fujiwara et al. | 455/435.1 |
| 2005/0227615 A1 | * | 10/2005 | Sakoda | 455/7 |
| 2006/0121899 A1 | * | 6/2006 | Willey et al. | 455/435.1 |
| 2006/0270422 A1 | * | 11/2006 | Benco et al. | 455/458 |
| 2008/0225760 A1 | * | 9/2008 | Iyer et al. | 370/310 |
| 2009/0286528 A1 | * | 11/2009 | Lie et al. | 455/422.1 |
| 2012/0282937 A1 | * | 11/2012 | He et al. | 455/450 |

* cited by examiner

*Primary Examiner* — Lester Kincaid
*Assistant Examiner* — Mehmood B Khan

(57) ABSTRACT

Disclosed are methods for determining which page attempt to shed. In accordance with these methods, when a page attempt from a first sequence directed to a first access terminal (AT) contends with a page attempt from a second sequence directed to a second AT for transmission over the air interface of a RAN, the RAN determines which sequence has been shed to a greater extent. The RAN then transmits the page attempt from the sequence that has been shed to a greater extent and sheds the page attempt from the sequence that has been shed to a lesser extent. The methods advantageously help to avoid one sequence of page attempts being disproportionately shed.

20 Claims, 4 Drawing Sheets

METHODS FOR INTELLIGENTLY SHEDDING PAGES

BACKGROUND

The use of access terminals (ATs) such as cellular telephones, personal digital assistants, pagers, or portable computers has become an increasingly popular means of communicating with others, accessing information, conducting business, and performing myriad other activities. ATs typically communicate with radio access networks (RANs) over a radio frequency (RF) air interface, using any of a number of communication protocols, such as the evolution-data optimized standard (EV-DO), WiMax, and the code division multiple access method (CDMA).

In a typical RAN, an area is divided geographically into a number of cells and sectors, each defined by a RF radiation pattern from a respective base station in the RAN. Within each sector (or cell), the base station's RF radiation pattern provides the RF air interface over which ATs may communicate with the RAN. In turn, the RAN may communicate with one or more other networks, such as the Public Switched Telephone Network (PSTN) or the Internet. Consequently, when an AT is positioned within a coverage area of the RAN (e.g., in a given sector or cell), the AT can communicate with entities on other networks via the RAN.

The RF air interface of any given sector (or cell) in the RAN is typically divided into a plurality of channels for carrying communications between access ATs and the RAN. For example, the RF air interface may include multiple forward-link channels—such as pilot channels, sync channels, paging channels, and forward-traffic channels—for carrying communications from the RAN to ATs. As another example, the RF air interface may also include multiple reverse-link channels—such as access channels and reverse-traffic channels—for carrying communications from the ATs to the RAN. Depending on the wireless technology used, the air interface can be divided into these channels through code division multiplexing (with each channel defined by modulation with one or more specific codes), time division multiplexing (with each channel defined as one or more recurring segments of time), frequency division multiplexing (with each channel defined by modulation with one or more specific frequencies), or through some other mechanism.

Overview

When a RAN seeks to transmit a message, such as a page message, via an air interface to an AT served by the RAN, the RAN typically engages in a sequence of page attempts until the RAN completes the sequence or until the RAN receives an acknowledgement message from the AT. For instance, when seeking to page an AT, the RAN may engage in a first page attempt by transmitting a page message over an air interface paging channel for receipt by the AT. If the RAN does not receive an acknowledgement in response from the access terminal within a defined time period, the RAN may then engage in a second (i.e., a next) page attempt by again transmitting the page message over the air interface paging channel for receipt by the AT. And once again, if the RAN does not receive an acknowledgement in response from the AT within a defined time period, the RAN may then engage in a third (i.e., a next) page attempt. This process may continue until the RAN has engaged in a predefined number of transmission attempts defining the sequence or until the RAN receives an acknowledgement from the AT.

The paging channel of the RAN may have limited capacity. Indeed, during high traffic times, or when the RAN is serving many ATs at the same time, there may be more page messages to be sent than there are available transmission slots in the paging channel. In that situation, the RAN may shed page attempts by deleting those page attempts without transmitting them to the appropriate AT. When a sequence has a pre-set number of page attempts, each page attempt that is shed decreases the likelihood of the RAN successfully paging the AT. Without any prioritization mechanism governing shedding, the RAN may shed multiple page attempts from the same sequence of page attempts directed to the same AT. This shedding may be disproportionate—there may be other sequences that have not had any page attempts shed.

Disclosed herein is a mechanism to help overcome this problem. In accordance with this mechanism, when a RAN encounters a situation in which a page attempt must be shed, the RAN may compare two sequences of page attempts to determine if either sequence has already had page attempts shed. Responsive to that comparison, the RAN may shed a page attempt from the sequence that has had no previous page attempts shed or fewer previous page attempts shed. The RAN may also transmit the page attempt from the sequence that has had previous page attempts shed or a greater number of previous page attempts shed. Consequently, the disclosed mechanism may distribute shedding across multiple page messages (each of which corresponds to a sequence of page attempts) and increase the likelihood that every page message is successful.

These as well as other aspects, advantages, and alternatives will become apparent to those of ordinary skill in the art by reading the following detailed description with reference where appropriate to the accompanying drawings.

DETAILED DESCRIPTION

Figure 1:
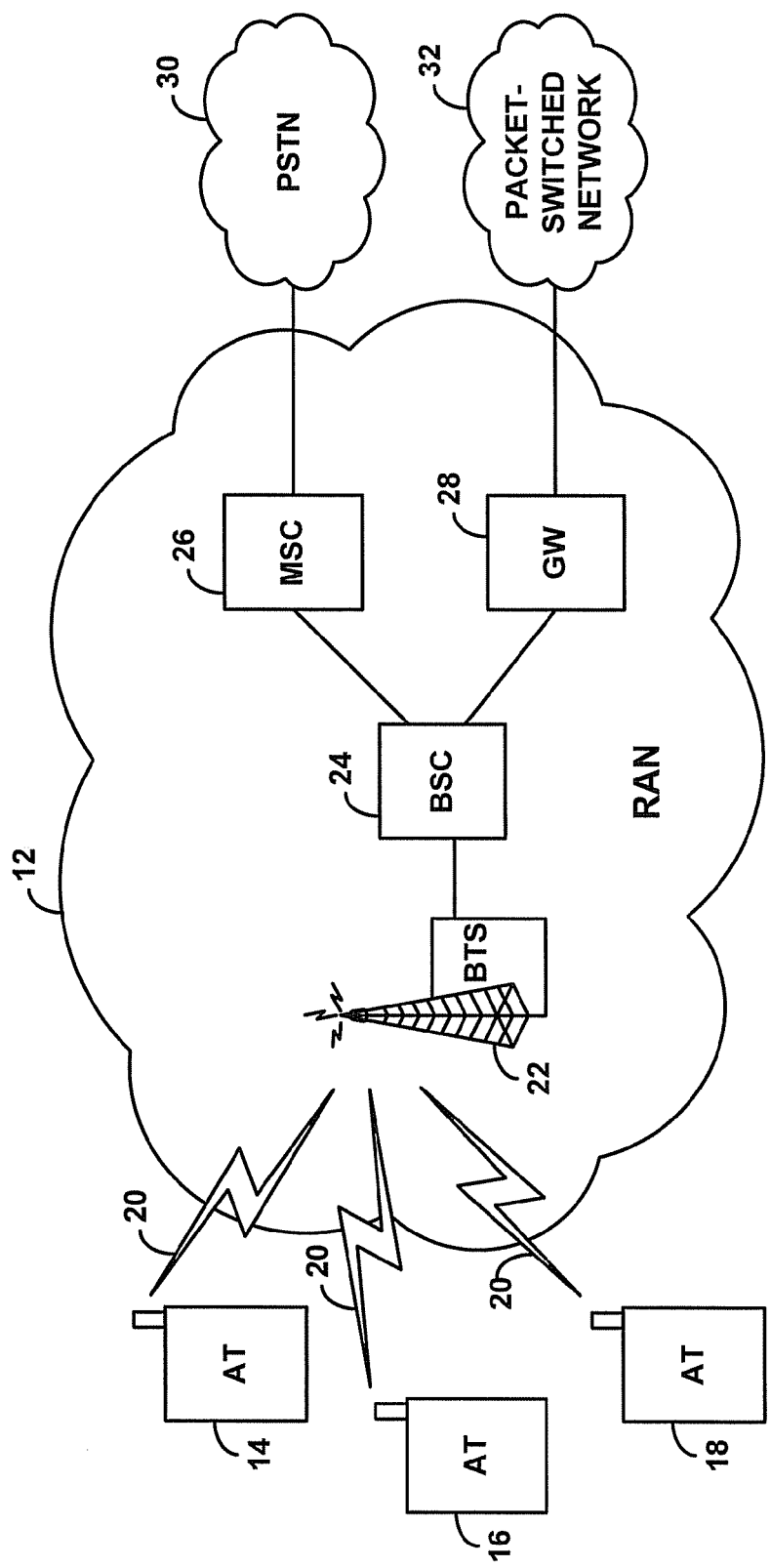
FIG. 1 is a simplified block diagram of a communication system in which an exemplary embodiment of the method can be implemented.

Referring to the drawings, as noted above, FIG. 1 is a simplified block diagram of a communication system in which the exemplary methods can be implemented. This and other arrangements and functions described herein (including in the overview section above) are provided by way of example only, and numerous variations may be possible. For instance, structural and functional elements can be added, omitted, combined, distributed, reordered, repositioned, or otherwise changed while remaining within the scope of the invention as defined by the claims. Further, various functions described herein can be carried out by hardware, firmware, or software (e.g., one or more processors programmed with machine language instructions to carry out the functions). Still further, the term "exemplary" as used herein should be understood to mean "serving as an example, instance, or illustration."

The system of FIG. 1 includes at its core a radio access network (RAN) 12 that is arranged to serve one or more access terminals (ATs)—ATs 14, 16, and 18 are shown—via an air interface 20 (or multiple air interfaces 20). The system, including RAN 12, ATs 14, 16, and 18, and air interface 20, may operate according to any wireless communication protocol now known or later developed, examples of which include without limitation CDMA (e.g., CDMA2000, EV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared.

Generally speaking, ATs 14, 16, and 18 may be any wireless communication devices that are capable of wirelessly communicating with RAN 12 and, in particular, any wireless communication devices that are capable of receiving and processing transmissions from RAN 12. The present method applies to page message transmissions; thus, the exemplary ATs 14, 16, and 18 are preferably devices capable of receiving and processing page message transmissions from RAN 12. Examples of such ATs include cellular telephones, wirelessly-equipped PDAs, wirelessly-equipped personal computers, and wirelessly-equipped appliances or devices of other sorts, now known or later developed.

RAN 12 may be any wireless serving network that is capable of communicating over an air interface with one or more ATs, such as ATs 14, 16, and 18, and, particularly, a network that is capable of sending paging channel messages, such as call setup page messages, message waiting indicators, data burst messages, or other sort of page messages now known or later developed, to ATs. As such, RAN 12 will include one or more antennas, one or more transceivers, and associated control logic for engaging in air interface communication with ATs according to any agreed air interface protocol.

As discussed above, the air interface in a given coverage area will preferably be divided into a number of forward-link channels, through any agreed mechanism, such as code division multiplexing for instance. By way of example, the air interface may define at least two paging channels on which RAN 12 can send page messages to served ATs.

RAN 12 may connect with one or more transport networks and signaling networks and may include logic to set up and carry communications between entities on the networks and served ATs. For instance, RAN 12 may include a network interface and program logic to receive a call setup message seeking to set up a call to a particular AT, and the RAN may responsively page the AT via the air interface 20 and ultimately set up a communication path over the air to the AT. Likewise, the RAN may respond to a request from the AT to place an outbound call to a particular entity, and the RAN may set up the call to the particular entity. Further, RAN 12 may receive a data-over-signaling message, such as a short message service (SMS) message or message waiting indicator (MWI), destined to a particular AT, and the RAN may transmit the message via an air interface paging channel to the AT. Similarly, the RAN may receive a data-over-signaling message, such as an outbound SMS message or MWI acknowledgement, from the AT and transmit the message to a destination entity.

Without limitation, FIG. 1 depicts an example configuration of RAN 12. As shown, exemplary RAN 12 includes a base station 22, a base station controller (BSC) 24, a mobile switching center (MSC) 26, and a packet data gateway (GW) 28. In other arrangements, the RAN could be in the form of a single element (e.g., a wireless access point router) or another more complex form that includes various different elements.

Base station 22 preferably includes an antenna tower (or other antenna structure) and associated equipment, including, for instance, a programmable processor, arranged to communicate over air interface 20 with one or more served ATs 14, 16, and 18. The antenna of base station 22 and associated equipment may be arranged to define a cell and various cell sectors in which ATs can operate.

BSC 24 is coupled with and functions to control one or more base stations such as base station 22, so as to manage aspects of base station and air interface operation. For instance, BSC 24 may manage handoff of ATs moving between base station coverage areas and may schedule air interface transmissions of data, other bearer traffic, or control traffic via base stations to or from various ATs. Further, BSC 24 may programmatically control the power of transmissions over the air interface, such as by directing base station 22 to increase or decrease the gain of its power amplifier or to set the gain at a specific level. Depending on the wireless protocol used, aspects of the base station 22 and BSC 24 may be combined together or distributed in other ways, collectively defining a base station system or general base station functionality. BSC 24 is shown communicatively linked to MSC 26 and GW 28.

MSC 26, in turn, is coupled with and functions to control one or more BSCs, such as BSC 22. For instance, MSC 26 may manage handoff of ATs moving among BSC coverage areas and may direct BSC 22, or base station 20 through BSC 22, to take various actions such as paging particular ATs. In a RAN with an MSC, the MSC may generally control operation of the RAN. Alternatively, the BSC (sometimes referred to as a radio network controller (RNC)) may generally control operation of the RAN. The inventive methods could be implemented using either network configuration or other configurations, as explained below.

MSC 26 is conventionally connected with the public switched telephone network (PSTN) 30, as shown in FIG. 1, so as to enable suitably equipped ATs (e.g., cellular telephones) to engage in telephone calls or other PSTN communications with entities on the PSTN.

In an example operation, when a call is placed to an AT, MSC 26 may receive a communication that triggers paging of the access terminal. For instance, the MSC 26 may receive an Integrated Services Digital Network User Part (ISUP) Initial Address Message (IAM) or other communication that signifies the call and identifies the AT. MSC 26 may then send a paging request to the BSC 24. In turn, the BSC may direct the base station 22 to send a page message over the air interface 20 in an effort to locate the called AT. If the AT is located in the coverage area of the RAN and receives the page message, the AT may then send a page response or acknowledgement message over the air to the RAN. If the RAN does not receive an acknowledgement from the AT, perhaps because the access terminal is not present or because an acknowledgement from the AT did not reach the RAN, the RAN may engage in a next page attempt of the page message and may continue to do so until the RAN completes a page attempt sequence (i.e. reaches a maximum number of page attempts) or until the AT responds. In a sequence of page attempts, for reasons such as the existence of contention on the paging channel, the RAN may shed, and thus not transmit, a page attempt. Upon receipt of an acknowledgement from the AT, BSC 24 may direct base station 22 to send to the AT a channel assignment message that contains identifying information for a traffic channel, and MSC 26 may connect the call through to the AT.

GW 28, in turn, is conventionally connected with a packet-switched network 32, such as the Internet or a wireless carrier's core transport network. GW 26 may function as a network access server such as a packet data serving node (PDSN), to provide connectivity between circuit-switched communications with ATs and packet-switched communications on network 32. Further or alternatively, GW 28 may function as a media gateway (MGW) and may carry out functions that would otherwise be carried out by MSC 26. GW 28 may also function as a Mobile-IP (MIP) foreign agent or home agent for ATs arranged to engage in MIP communication via network 32, in a manner well known in the art.

BSC 24 and GW 28 may work together to enable suitably equipped ATs 14, 16, and 18 to engage in packet-data communications, such as voice over IP (VoIP) communications, on network 32. In practice, for instance, an AT may initially work with the RAN to establish packet-data connectivity in accordance with any agreed protocol. When packet-data is transmitted to an AT, GW 28 or BSC 24 may receive that data in the form of a communication that triggers the paging of the AT. GW 28 may, for instance, pass the data along to BSC 24 and instruct the BSC to page the AT, and BSC 24 may then direct base station 22 to send a page message over air interface 20 in an effort to locate the AT. If the AT is located in the coverage area of the RAN and receives the page message, the AT may then send a page response message (e.g., a connection request message) over the air to the RAN. Alternatively, if the RAN does not receive a response from the AT, then the RAN may engage in a next page attempt in the sequence for the page message, and the RAN may continue to do so until the RAN completes the sequence or until the AT responds. The likelihood that the AT will respond may be decreased if page attempts in the sequence are shed (and not transmitted) due to contention for the air interface. Upon receipt of a response from the AT, BSC 24 may direct the base station to send to the AT a traffic channel assignment message that contains identifying information for a traffic channel, and the BSC may then transmit the packet data via that traffic channel to the AT.

Each of the components of RAN 12, including base station 22, BSC 24, MSC 26, and GW 28, preferably includes one or more processors, data storage, and program instructions stored in the data storage and executable by the processors to carry out the various functions described herein. Alternatively or additionally, these or other RAN components may include other forms of logic, such as firmware or hardware logic, to carry out the various functions described.

Figure 2:
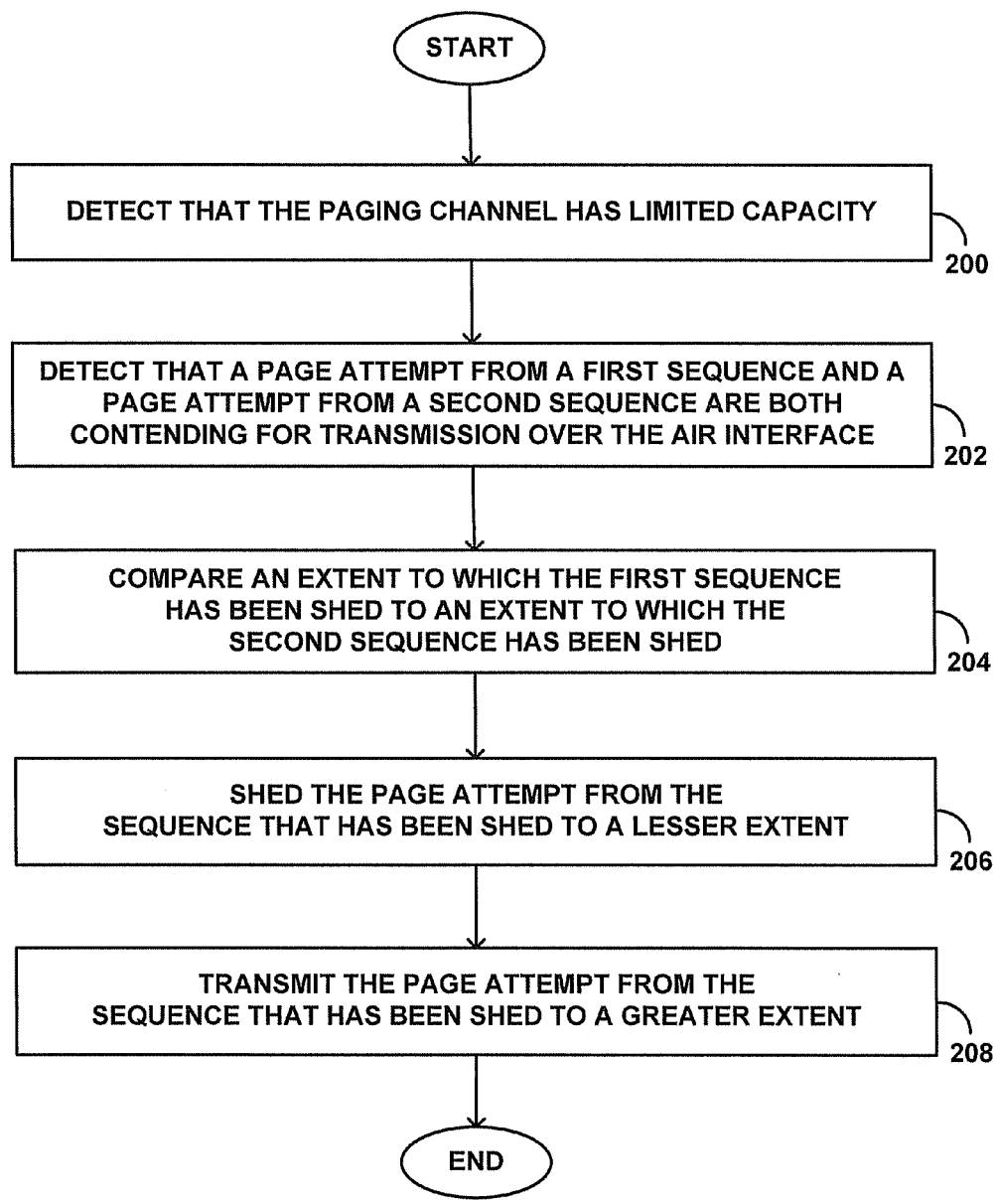
FIG. 2 is a flow chart depicting functions that can be carried out in accordance with an exemplary embodiment of the method.

Referring next to FIG. 2, a flow chart is provided to illustrate various functions that can be carried out in accordance with an exemplary method. The method of FIG. 2 will be explained with reference to the components of FIG. 1, but other suitable networks, entities, and configurations may be used to implement the method.

At block 200, base station 22 detects that the paging channel has limited capacity. This detection may be a comparison of the bandwidth necessary to transmit all queued or pending page messages with the bandwidth available on the paging channel. Indeed, during high traffic times, or when RAN 12 is serving many ATs, there may be more page messages to be sent than there is available bandwidth to send them. This detection may also be a determination that the paging channel cannot immediately transmit two page attempts.

At block 202, base station 22 detects that a page attempt from a first sequence and a page attempt from a second sequence are both contending for transmission over the air interface. In a preferred embodiment, these two sequences are directed to different ATs, but they may also be directed to the same AT. The detection at block 202 may occur simultaneously to the detection that the paging channel has limited capacity. Alternatively, block 200 may be skipped, and the method may begin with the detection of contention at block 202. The detection of contention at block 202 indicates that one of the two page attempts will be shed, and the other will be transmitted.

At block 204, base station 22 compares an extent to which the first sequence has been shed to an extent to which the second sequence has been shed. This comparison may be between the numbers of page attempts that have been shed in each sequence. Alternatively, this comparison may be between calculated quantities that indicate the extent to which each sequence has been shed. For instance, a shed factor parameter may be computed for each sequence. The shed factor may be an exact count of the number of page attempts that have been shed for the sequence. For example, in this embodiment, if a sequence had had no previous page attempts shed, the shed factor for that sequence would be zero. Alternatively, the shed factor may be computed according to a formula that takes the number of page attempts that have been shed as an input. The shed factor could therefore be a multiple—or other arithmetic, geometric, algebraic function—of the number of page attempts shed. The comparison may be a comparison of the two shed factors.

At block 206, base station 22 sheds the page attempt from the sequence that has been shed to a lesser extent. As an example, this may be the sequence that has had fewer previous page attempts shed. Base station 22 also transmits the page attempt from the sequence that has been shed to a greater extent—this may be the sequence that has had more previous page attempts shed—at block 208. Blocks 206 and 208 may occur at substantially the same time.

In an alternate embodiment, MSC 26, rather than base station 22, may perform the functions at blocks 200, 202 and 204. Base station 22 may communicate, through BSC 24, necessary information about the paging channel and about its own shedding behavior so that MSC 26 may detect the limited capacity of the paging channel at block 200, detect that two page attempts are in contention for the paging channel at block 202, and compare the extent to which each sequence has been shed at block 204. As one example, after it sheds a page attempt, base station 22 may send via BSC 24 a communication to MSC 26 indicating that a page attempt was shed and from which sequence that page attempt came.

Figure 3:
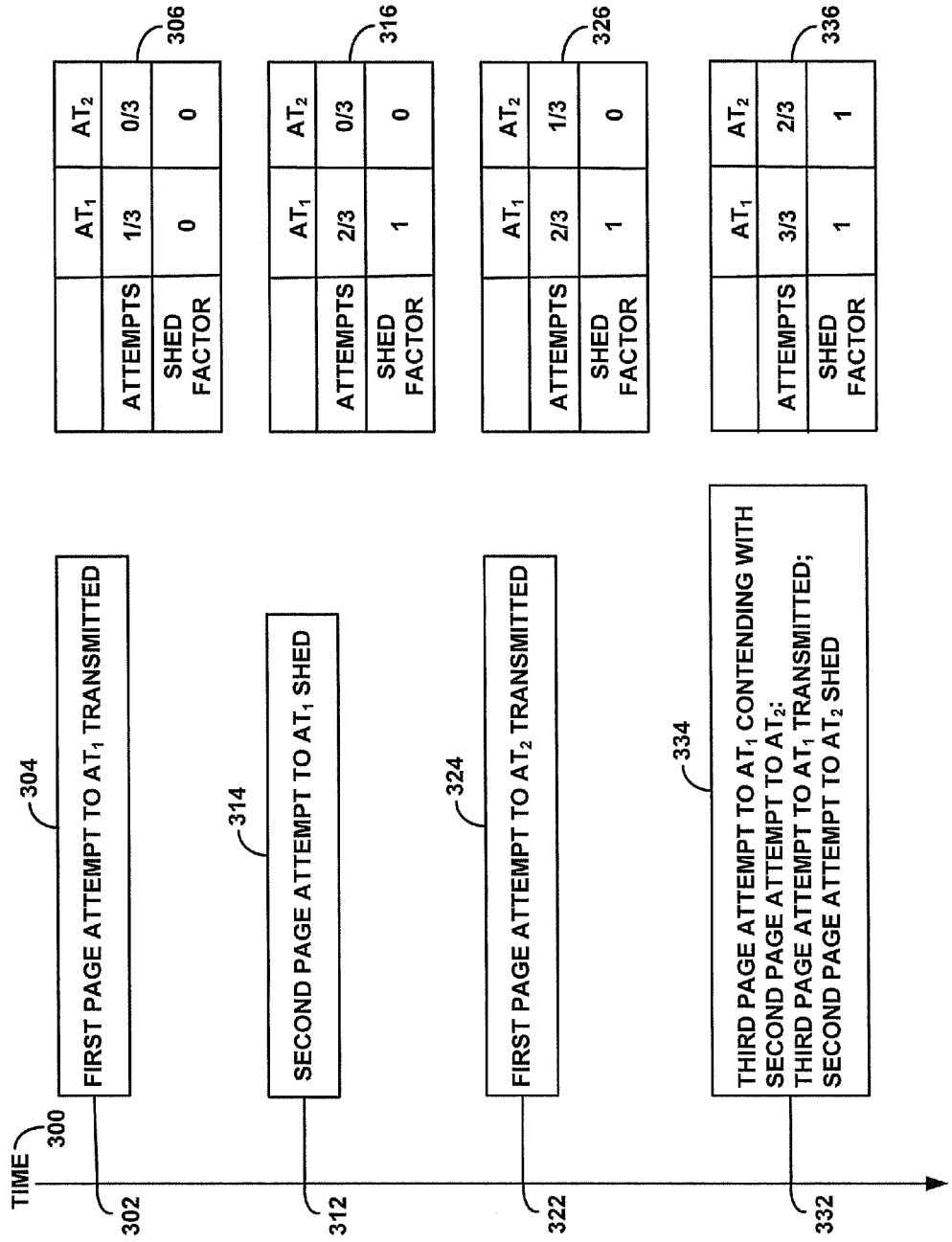
FIG. 3 is a timeline of messaging events showing the operation of another exemplary method.

FIG. 3 is a timeline of events illustrating the operation of another exemplary method. For the purposes of FIG. 3, a sequence of page attempts for a single page message consists of three page attempts, and a shed factor parameter is maintained for each sequence equal to the number of page attempts in the sequence that have been shed. This example should not be read as limiting the scope of the claims: in particular, a sequence could consist of any number of page attempts, and the shed factor parameter could be calculated differently or not explicitly calculated at all.

The example in FIG. 3 consists of two page messages, one directed to $AT_1$ and one directed to $AT_2$. Four events occur at different times, charted along time axis 300. At time 302, event 304 occurs—the transmission of the first page attempt in the sequence of page attempts to $AT_1$. As reflected in status box 306, one of the three page attempts from the appropriate sequence has been transmitted to $AT_1$, whereas no attempts have yet been transmitted from the sequence to $AT_2$. Additionally, because no page attempts from either sequence have been shed, both sequences have a shed factor of zero.

Next, at time 312 (which may be the same as time 302), a second page attempt to $AT_1$ is shed in event 314. Correspondingly, status box 316 shows that the sequence directed to $AT_1$ has now proceeded through two out of three total attempts and that the shed factor for $AT_1$ is now one, because one of those two attempts was shed. At time 322, the first page attempt to $AT_2$ is transmitted in event 324, and status box 326 is updated to show that one out of three attempts has been made for the $AT_2$ sequence.

At time 332, event 334 occurs: the third page attempt to $AT_1$ and the second page attempt to $AT_2$ contend for transmission over the paging channel. In this example, the assumption is that only one of the two page attempts can be transmitted due to limited capacity on that channel at time 332. Therefore, the shed factors of the two sequences are compared to determine which attempt will be transmitted. Using the data from status box 326, the sequence directed to $AT_1$ has a shed factor of one, whereas the sequence directed to $AT_2$ has a shed factor of zero. These numbers indicate that the sequence directed to $AT_1$ has been shed to a greater extent than has the sequence directed to $AT_2$. Because the sequence directed to $AT_1$ has been shed to a greater extent, in event 334, the third page attempt to $AT_1$ is transmitted, and the second page attempt to $AT_2$ is shed. After event 334, status box 336 shows the updated status for each of the sequences—the sequence to $AT_1$ is now finished, having proceeded through all three of three page attempts, and the sequence to $AT_2$ has proceeded through two of three attempts and now has a shed factor of one.

Figure 4:
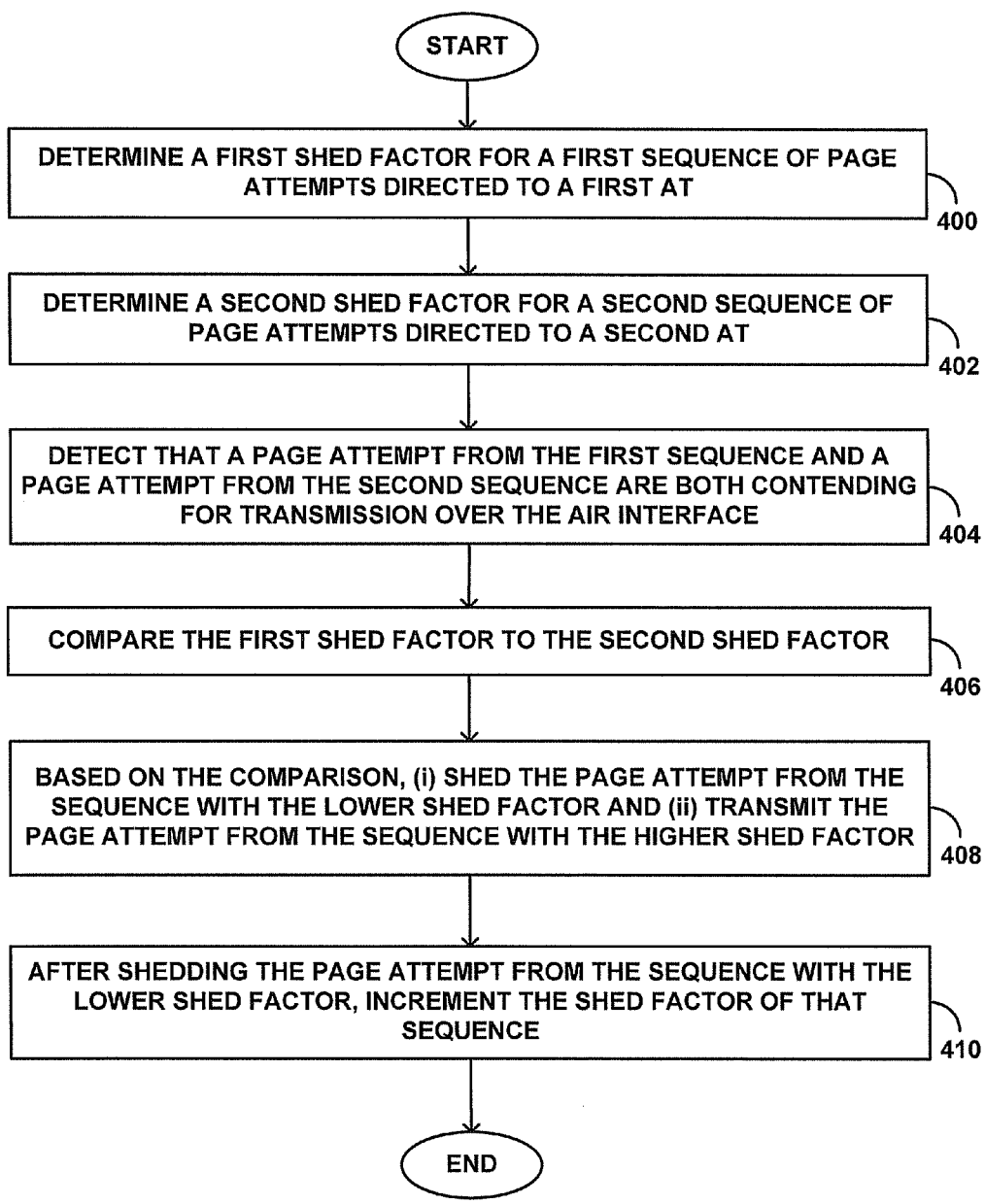
FIG. 4 is a flow chart depicting functions that can be carried out in accordance with yet another exemplary embodiment of the method.

Turning next to FIG. 4, a flow chart is provided to illustrate various functions that can be carried out in accordance with yet another exemplary method. The method of FIG. 4 will be explained with reference to the components of FIG. 1, but other suitable networks, entities, and configurations may be used to implement the method. Starting at block 400, base station 22 determines a first shed factor for a first sequence of page attempts for a page message directed to a first AT, AT 14. At block 402, base station 22 determines a second shed factor for a second sequence of page attempts for a page message directed to a second AT, AT 16. The first and second shed factors may be the number of page attempts that have been shed from each sequence, as was shown in FIG. 3, or may be a different calculation indicating the extent to which the each sequence has been shed.

At block 404, base station 22 detects that a page attempt from the first sequence directed to AT 14 is contending with a page attempt from the second sequence directed to AT 16 for transmission over air interface 20. In a preferred embodiment, the two attempts are contending for transmission over a forward-link paging channel in air interface 20. At block 406, base station 22 compares the first shed factor to the second shed factor.

On the basis of the comparison, base station 22 sheds the page attempt from the sequence with the lower shed factor, and transmits the page attempt from the sequence with the higher shed factor, at block 408. Finally, at block 410 and after shedding the page attempt from the sequence with the lower shed factor, base station 22 increments the shed factor of that sequence.

In an alternate embodiment, MSC 26, rather than base station 22, may perform the functions at blocks 400, 402, 404, 406, and 410. Base station 22 may communicate necessary information about the paging channel and about its own shedding behavior so that MSC 26 may determine the two shed factors at blocks 400 and 402, detect that two page attempts are in contention for the air interface at block 404, and compare the shed factors at block 406. Further, after the comparison at block 406, MSC 26 may communicate instructions to base station 22, through BSC 24, as to which page attempt to shed and which to transmit. Next, base station 20 may send a communication via BSC 24 to MSC 26 indicating that page attempts were shed and transmitted according to those instructions, and at block 410, MSC 26 may increment the appropriate shed factor.

Exemplary embodiments are described above. Those skilled in the art will appreciate, however, that numerous variations from the embodiments described are possible while remaining within the scope of the invention as claimed.

We claim:

1. In a radio access network (RAN) in which, when the RAN seeks to transmit a page via an air interface to an access terminal (AT) served by the RAN, the RAN engages in a sequence of page attempts until an acknowledgement is received or an end of the sequence is reached, a method for determining a page attempt to shed, comprising:

detecting that a page attempt from a first sequence and a page attempt from a second sequence are both contending for transmission over the air interface;

comparing an extent to which the first sequence has been shed to an extent to which the second sequence has been shed;

shedding the page attempt from the sequence that has been shed to a lesser extent; and transmitting the page attempt from the sequence that has been shed to a greater extent.

2. The method of claim 1, wherein the detecting, comparing, shedding, and transmitting are carried out by a base station.

3. The method of claim 1, wherein at least the detecting and comparing are carried out by a mobile switching center (MSC).

4. The method of claim 1, wherein page attempts are transmitted over a paging channel in the air interface, and wherein the paging channel is a forward-link channel, the method further comprising:

detecting that the paging channel has limited capacity.

5. The method of claim 4, wherein detecting that a page attempt from a first sequence and a page attempt from a second sequence are both contending for transmission over the air interface comprises a determination that the paging channel cannot immediately transmit both the page attempt from the first sequence and the page attempt from the second sequence.

6. The method of claim 1, wherein the extent to which the first sequence has been shed comprises a number of page attempts from the first sequence that have been shed and thus have not been transmitted, and wherein the extent to which the second sequence has been shed comprises a number of page attempts from the second sequence that have been shed and thus have not been transmitted.

7. The method of claim 1, wherein the first sequence and the second sequence are directed to different ATs.

8. In a radio access network (RAN) in which, when the RAN seeks to transmit a page via an air interface to an access terminal (AT) served by the RAN, the RAN engages in a sequence of page attempts until an acknowledgement is received or an end of the sequence is reached, a method for determining a page attempt to shed, comprising:

determining a first shed factor for a first sequence of page attempts directed to a first AT, such that the first shed factor is related to a number of page attempts in the first sequence that have been shed and thus have not been transmitted to the first AT;

determining a second shed factor for a second sequence of page attempts directed to a second AT, such that the second shed factor is related to a number of page attempts in the second sequence that have been shed and thus have not been transmitted to the second AT;

detecting that a page attempt from the first sequence and a page attempt from the second sequence are both contending for transmission over the air interface;

comparing the first shed factor to the second shed factor; and based on the comparison, (i) shedding the page attempt from the sequence with the lower shed factor and (ii) transmitting the page attempt from the sequence with the higher shed factor.

9. The method of claim 8, wherein the determining a first shed factor, determining a second shed factor, detecting, comparing, shedding, and transmitting are carried out by a base station.

10. The method of claim 8, wherein at least the determining a first shed factor, determining a second shed factor, detecting, and comparing are carried out by a mobile switching center (MSC).

11. The method of claim 8, wherein page attempts are transmitted over a paging channel in the air interface, and wherein the paging channel is a forward-link channel, the method further comprising:

detecting that the paging channel has limited capacity.

12. The method of claim 11, wherein detecting that a page attempt from the first sequence and a page attempt from the second sequence are both contending for transmission over the air interface comprises a determination that the paging channel cannot immediately transmit both the page attempt from the first sequence and the page attempt from the second sequence.

13. The method of claim 8, wherein the first AT and the second AT are different ATs.

14. The method of claim 8, further comprising:

after shedding the page attempt from the sequence with the lower shed factor, incrementing the shed factor of that sequence.

15. A method for determining a page attempt to shed, comprising:

a radio access network (RAN) seeking to transmit a first page message via an air interface to a first access terminal (AT) by engaging in a first sequence of page attempts;

the RAN seeking to transmit a second page message via the air interface to a second AT by engaging in a second sequence of page attempts;

the RAN detecting that a page attempt from the first sequence and a page attempt from the second sequence are both contending for transmission over the air interface;

the RAN determining a first shed factor for the first sequence, such that the first shed factor is related to the extent to which the first sequence has been shed and thus has not been transmitted to the first AT;

the RAN determining a second shed factor for the second sequence, such that the second shed factor is related to the extent to which the second sequence has been shed and thus has not been transmitted to the second AT;

the RAN comparing the first shed factor to the second shed factor; and based on the comparison, the RAN (i) shedding a page attempt from the sequence with the lower shed factor and (ii) transmitting a page attempt from the sequence with the higher shed factor.

16. The method of claim 15, wherein the detecting, determining a first shed factor, determining a second shed factor, comparing, shedding, and transmitting are carried out by a base station of the RAN.

17. The method of claim 15, wherein at least the detecting, determining a first shed factor, determining a second shed factor, and comparing are carried out by a mobile switching center (MSC) of the RAN.

18. The method of claim 15, wherein page attempts are transmitted over a paging channel in the air interface, and wherein the paging channel is a forward-link channel, the method further comprising:

the RAN detecting that the paging channel has limited capacity.

19. The method of claim 18, wherein the RAN detecting that a page attempt from the first sequence and a page attempt from the second sequence are both contending for transmission over the air interface comprises the RAN determining that the paging channel cannot immediately transmit both the page attempt from the first sequence and the page attempt from the second sequence.

20. The method of claim 15, wherein the first AT and the second AT are different ATs.

* * * * *